United States Patent
Ishikawa

(10) Patent No.: US 7,680,597 B2
(45) Date of Patent: Mar. 16, 2010

(54) GUIDED VEHICLE SYSTEM AND TRAVEL ROUTE MAP CREATION METHOD FOR GUIDED VEHICLE SYSTEM

(75) Inventor: Daigo Ishikawa, Niwa-gun (JP)

(73) Assignee: Murata Kikai Kabushiki Kaisha, Kyoto-shi (JP)

( * ) Notice: Subject to any disclaimer, the term of this patent is extended or adjusted under 35 U.S.C. 154(b) by 842 days.

(21) Appl. No.: 11/483,535

(22) Filed: Jul. 11, 2006

(65) Prior Publication Data

US 2007/0016369 A1    Jan. 18, 2007

(30) Foreign Application Priority Data

Jul. 14, 2005    (JP) ............... 2005-205156

(51) Int. Cl.
    *G01C 21/30* (2006.01)
    *G01C 21/32* (2006.01)
(52) U.S. Cl. .............. 701/211; 701/208; 340/900; 340/995.1; 340/995.28
(58) Field of Classification Search ......... 701/200–211; 340/995.1, 915.12, 915.14, 988, 995.1 TO, 340/995.28
    See application file for complete search history.

(56) References Cited

U.S. PATENT DOCUMENTS

| 7,131,094 | B2 * | 10/2006 | Kolk et al. .................. 716/12 |
| 7,149,677 | B2 * | 12/2006 | Jayaram et al. ............... 703/22 |
| 7,373,244 | B2 * | 5/2008 | Kreft ......................... 701/207 |
| 7,382,405 | B2 * | 6/2008 | Kusaka et al. ............. 348/231.6 |
| 2004/0225432 | A1 * | 11/2004 | Pilley et al. .................. 701/117 |
| 2005/0001024 | A1 * | 1/2005 | Kusaka et al. ................ 235/375 |
| 2005/0132317 | A1 * | 6/2005 | Kolk et al. .................... 716/11 |
| 2005/0251331 | A1 * | 11/2005 | Kreft ............................ 701/207 |
| 2007/0016369 | A1 * | 1/2007 | Ishikawa ...................... 701/211 |
| 2008/0239083 | A1 * | 10/2008 | Kusaka et al. ............... 348/207.1 |
| 2009/0132420 | A1 * | 5/2009 | Silverbrook et al. .......... 705/50 |

FOREIGN PATENT DOCUMENTS

| JP | 61-102370 A | 5/1986 |
| JP | 63-62006 A | 3/1988 |
| JP | 64-4815 A | 1/1989 |

(Continued)

OTHER PUBLICATIONS

Yang et al., Multi-layer Area Routing Algorithm with Optimized Pin Mapping Strategy, Oct. 2003, IEEE, pp. 229-232. cited by other.*

(Continued)

*Primary Examiner*—Cuong H Nguyen
(74) *Attorney, Agent, or Firm*—Westerman, Hattori, Daniels & Adrian, LLP

(57) ABSTRACT

CAD data of a guided vehicle system is converted into layout data of a map. The layout data is displayed on a screen. Attribute data is added to the layout data to edit the map data. The edited map data is distributed to overhead traveling vehicles. By controlling a probe vehicle to actually travel on a travel route, positions of load ports and buffers on the map, and data about transfer to/from these load ports and buffers are verified, and updated, and then, the resulting data is distributed to the other overhead traveling vehicles and a controller.

3 Claims, 5 Drawing Sheets

FOREIGN PATENT DOCUMENTS

| JP | 2-311907 A | | 12/1990 |
|---|---|---|---|
| JP | 2-311907 (A) | | 12/1990 |
| JP | 11-259130 A | | 9/1999 |
| JP | 2001-125639 A | | 5/2001 |
| JP | 2001-368014 | * | 12/2001 |
| JP | 2001-373831 | * | 12/2001 |
| JP | 2001-375568 | * | 12/2001 |
| JP | 2004-110111 A | | 4/2004 |
| JP | 2004-227058 A | | 8/2004 |
| JP | 2005-25501 A | | 1/2005 |
| WO | PCT/JP02/12625 | * | 12/2002 |

OTHER PUBLICATIONS

A flexible multiple mobile robots system; Fok, K.-C.H.; Kabuka, M.R.; Robotics and Automation, IEEE Transactions on vol. 8, Issue 5, Oct. 1992 pp. 607-623; Digital Object Identifier 10.1109/70.163785.*

Decentralized coordination of autonomous AGVs in flexible manufacturing systems; Herrero-Perez, D.; Matinez-Barbera, H.; Intelligent Robots and Systems, 2008. IROS 2008. IEEE/RSJ International Conference on Sep. 22-26, 2008 pp. 3674-3679; Digital Object Identifier 10.1109/IROS.2008.4650894.*

A hierarchical architecture to control autonomous robots evolving in an unknown environment Mourioux, G.; Novales, C.; Poisson, G.; Industrial Technology, 2004. IEEE ICIT '04. 2004 IEEE International Conference on vol. 1, Dec. 8-10, 2004 pp. 72-77 vol. 1; Digital Object Identifier 10.1109/ICIT.2004.1490259.*

Frontmatter: 2008 IEEE MTT-S International Microwave Symposium Digest—MTT 2008; Microwave Symposium Digest, 2008 IEEE MTT-S International; Jun. 15-20, 2008 pp. i-dlxxxv; Digital Object Identifier 10.1109/MWSYM.2008.4632907.*

Spatial Outsourcing for Location-based Services; Yin Yang; Papadopoulos, S.; Papadias, D.; Kollios, G.; Data Engineering, 2008. ICDE 2008. IEEE 24th International Conference on; Apr. 7-12, 2008 pp. 1082-1091; Digital Object Identifier 10.1109/ICDE.2008.4497517.*

Driver Assisting System for Eco-Vehicles with Motor Drive Systems Which Avoids Collision with Running Vehicles by Using Inter-Vehicle Communications; Mutoh, et al..; Intelligent Transportation Systems Conf., 2007. ITSC 2007. IEEESep. 30-Oct. 3, 2007 pp. 508-513; Digital Object Identifier 10.1109/ITSC.2007.43577.*

Standardized GPS Simulation Scenarios for SPS Receiver Testing; Hay, C.; Position, Location, and Navigation Symposium, 2006 IEEE/ION; Apr. 25-27, 2006 pp. 1080-1085.*

The weak GPS signal parallel processing algorithm in dual-core based GPS software receiver; Yongrong Sun; Jianfeng Miao; Wu Chen; Jianye Liu; Systems and Control in Aerospace and Astronautics, 2008. ISSCAA 2008. 2nd International Symposium on Dec. 10-12, 2008 pp. 1-6; Digital Object Identifier 10.1109/ISSCAA.2008.4776221.*

Vehicle identification and GPS error detection from a LIDAR equipped probe vehicle; Bin Gao; Coifman, B.; Intelligent Transportation Systems Conference, 2006. ITSC '06. IEEE; Sep. 17-20, 2006 pp. 1537-1542; Digital Object Identifier 10.1109/ITSC.2006.1707442.*

Design considerations for direct RF sampling receiver in GNSS environment; Syrjala, V.; Valkama, M.; Renfors, M.; Positioning, Navigation and Communication, 2008. WPNC 2008. 5th Workshop on; Mar. 27-27, 2008 pp. 9-13 Digital Object Identifier 10.1109/WPNC.2008.4510351.*

InHand—mobile professional context and location aware tool; Neves, P.A.C.S.; Ferreira, D.J.M.; Esteves, D.; Felix, D.R.M.; Rodrigues, J.J.P.C.; Software, Telecommunications and Computer Networks, 2008. SoftCOM 2008. 16th International Conference on; Sep. 25-27, 2008 pp. 80-84; Digital Object Identifier 10.1109/SOFTCOM.2008.4669456.*

Wireless Localization Using Self-Organizing Maps; Giorgetti, G.; Gupta, S.K.S.; Manes, G.; Information Processing in Sensor Networks, 2007. IPSN 2007. 6th International Symposium on; Apr. 25-27, 2007 pp. 293-302; Digital Object Identifier 10.1109/IPSN.2007.4379689.*

Japanese Office Action dated Jan. 9, 2009 (mailing date), issued in corresponding Japanese Patent Application No. 2005-205156.

Japanese Office Action dated Oct. 8, 2008, issued in corresponding Japanese Patent Application No. 2005-205156.

* cited by examiner

GUIDED VEHICLE SYSTEM AND TRAVEL ROUTE MAP CREATION METHOD FOR GUIDED VEHICLE SYSTEM

TECHNICAL FIELD

The present invention relates to a guided vehicle system. In particular, the present invention relates to a technique of creating a map of a travel route.

BACKGROUND ART

In a guided vehicle system, each of guided vehicles stores a map of a travel route. A layout of the travel route, and attribute data such as positions of load ports and buffers, and data about transfer to/from the load ports and buffers are written in the map. For example, the layout data is vector data indicating the positions of branch sections and merge sections, the length of each straight segment, the position and the radius of curvature of each curve segment, and the angle between the entrance and the exit of the curve.

At the time of newly providing the guided vehicle system, CAD data for constructing travel rails, load ports, buffers or the like is created. For example, the CAD data includes information about connection relationship between rail units such as straight rail units, branch rail units, merge rail units, and curve rail units, and the numbers of these rail units. These rail units are standardized. For example, positions of the branch sections, the merge sections, and the curve segments are roughly determined, and the numbers of the straight units and the curve units are counted using the CAD data for determining the length of each straight segment, and the positions of the branch sections, the merge sections, and the curve segments. Further, an operator manually picks up attribute data from the CAD data, and inputs the attribute data in the map. In this manner, the map data is created manually from the CAD data. Therefore, creation of the map is laborious.

In the specification, the map data is also simply referred to as the map, and the layout data is also simply referred to as the layout.

SUMMARY OF THE INVENTION

An object of the present invention is to simplify creation of map data.

Secondary object of the present invention is to make it possible to create the map data more efficiently.

Secondary object of the present invention is to correct installation errors of ancillary equipment such as load ports in CAD data, and reflects the correction in the entire system.

The present invention relates to a guided vehicle system in which a guided vehicle stores a map of a travel route and travels along the travel route. The guided vehicle system comprises:

display means for displaying a layout of the travel route on a screen; and editing means for inputting attribute data on the travel route to the displayed layout for creating the map.

The attribute data includes data regarding equipment such as load ports, buffers, and dogs on the travel route, and annotation data for the layout data such as the branch direction on the travel route. The layout data is data indicating the geometrical arrangement of the layout itself.

Preferably, the guided vehicle system further comprises conversion means for converting CAD data used for constructing the guided vehicle system into the layout of the travel route.

Further, preferably, the guided vehicle system comprises distribution means for distributing the created map to the guided vehicle and verification means for verifying the attribute data on the map provided in at least one of the guided vehicles, for distributing the verified map to respective guided vehicles. Distribution of the map is carried out by distributing data through a LAN on the ground or a wireless LAN.

Preferably, at the time of changing the layout, the conversion means extracts change portion of the CAD data, and converts the extracted change portion into the layout, and combines the layout with the map before the change.

More preferably, the guided vehicle system further comprises distribution means for distributing the created map to the guided vehicle, and means for obtaining the attribute data on the map provided in at least one of the guided vehicles. The attribute data obtaining means obtains the attribute data for the layout converted from the CAD data to update the map, and distributes the updated map to respective guided vehicles.

The present invention provides a method of creating a map of a travel route for allowing a guided vehicle to store the map of the travel route, and to travel along the travel route. The map creation method comprises the steps of:

displaying a layout of the travel route on a screen;

obtaining attribute data on the travel route for the displayed layout;

inputting the obtained attribute data; and allowing edition of the layout with the inputted attribute data to create the map of the travel route.

Preferably, the map creation method further comprises the step of converting CAD data used for constructing the guided vehicle system into the layout of the travel route.

Further, preferably, the map creation method further comprises the steps of:

distributing the created map to the guided vehicle;

controlling the guided vehicle with the distributed map to travel along the travel route for verifying the attribute data on the map; and distributing the verified map to another guided vehicle.

In the present invention, it is possible to edit the attribute on the screen displaying the layout. Therefore, the map data can be created easily.

By converting the CAD data into the layout data, the laborious operation of manually inputting the layout from the CAD data can be omitted.

Further, by controlling the guided vehicle to travel along the travel route for verifying the attribute data, and distributing the verified map to respective guided vehicles, installation errors of ancillary equipment such as load ports and buffers is corrected in the map, and the corrected map can be loaded easily in the guided vehicles.

At the time of changing the layout, the conversion means extracts change portion of the CAD data, converts the extracted change portion into the layout, and combines the layout with the map before the change. In the system, the map can be updated easily.

In this case, if the guided vehicle obtains the attribute data for the change portion of the CAD data, the map can be updated even more easily.

Figure 1:
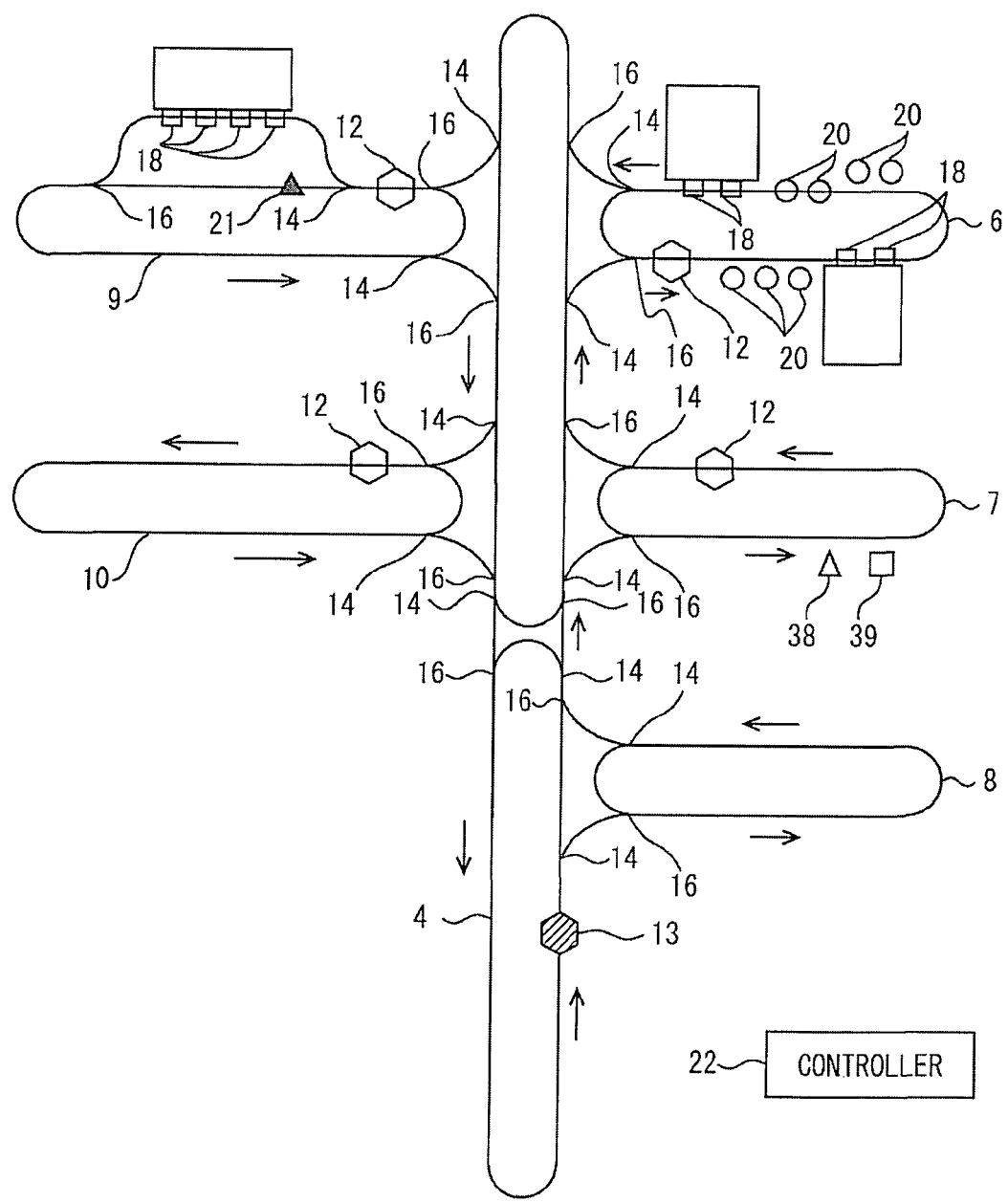
FIG. 1 is a plan view showing the layout of a guided vehicle system according to an embodiment.

| Brief Description of the Symbols | |
|---|---|
| 2 | Guided vehicle system |
| 4 | Inter-bay route |
| 6-10 | Intra-bay route |
| 12 | Overhead traveling vehicles |
| 13 | Probe vehicle |
| 14 | Branch section |
| 16 | Merge section |
| 18 | Load port |
| 20 | Buffer |
| 21 | Acceleration point |
| 22 | Controller |
| 30 | map data editing apparatus |
| 32 | Data conversion unit |
| 33 | editing unit |
| 34 | Display unit |
| 35 | Memory unit |
| 36 | Input/output |

EMBODIMENT

Hereinafter, an embodiment in the most preferred form for carrying out the present invention will be described.

FIGS. 1 to 5 show a guided vehicle system 2 according to the embodiment. Though the embodiment will be described taking a system of overhead traveling vehicles as an example, the present invention is applicable to a system of rail vehicles on the ground, and a system of automated non-rail guided vehicles on the ground. The guided vehicle system 2 includes travel routes such as an inter-bay route 4 as a main route and intra-bay routes 6 to 10 provided for respective bays. For example, more than one hundred overhead traveling vehicles 12 travel on the travel routes.

A reference numeral 13 denotes a probe vehicle. For example, one vehicle selected from the overhead traveling vehicles 12 is used as the probe vehicle 13. The probe vehicle 13 is equipped with a sensor 40 for verifying positions of load ports (stations for transfer of articles) 18 and buffers 20 for temporality storing articles, data about transfer to/from the load ports 18 and the buffers 20, and positions of points used in the control such as an acceleration point 21. Further, the probe vehicle 13 is equipped with sensors 41, 42, etc. for verifying the states of the routes 4 to 10 such as the degree of vibration at the time of traveling, positions of various dogs 38 and IDs 39 for reading data provided on the travel route, and the states of the dogs 38 and IDs 39, e.g., the dogs 38 and IDs 39 are readable or not. Based on the verified data of the probe vehicle 13, the map (not shown) of the routes 4 to 10 is updated. A reference numeral 22 denotes a controller of the guided vehicle system 2. Alternatively, a controller of the entire system 2, and lower level controllers of respective bays may be provided separately.

Figure 2:
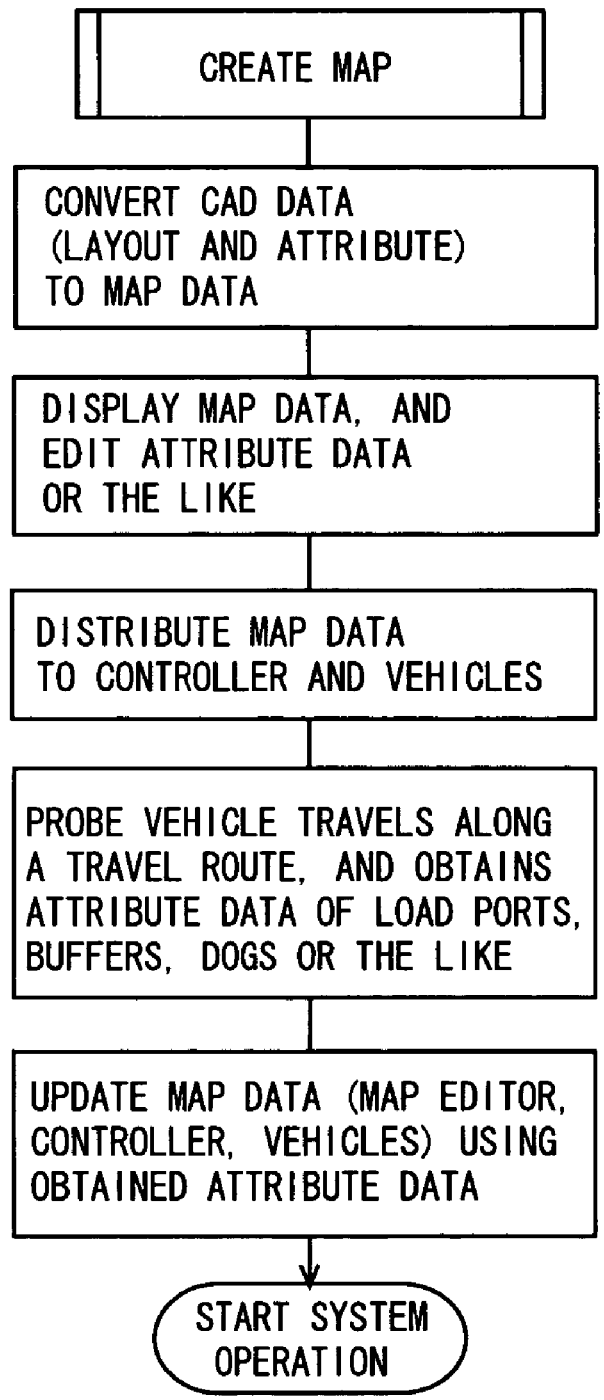
FIG. 2 is a flowchart showing an algorithm of generating a map according to the embodiment.
Figure 3:
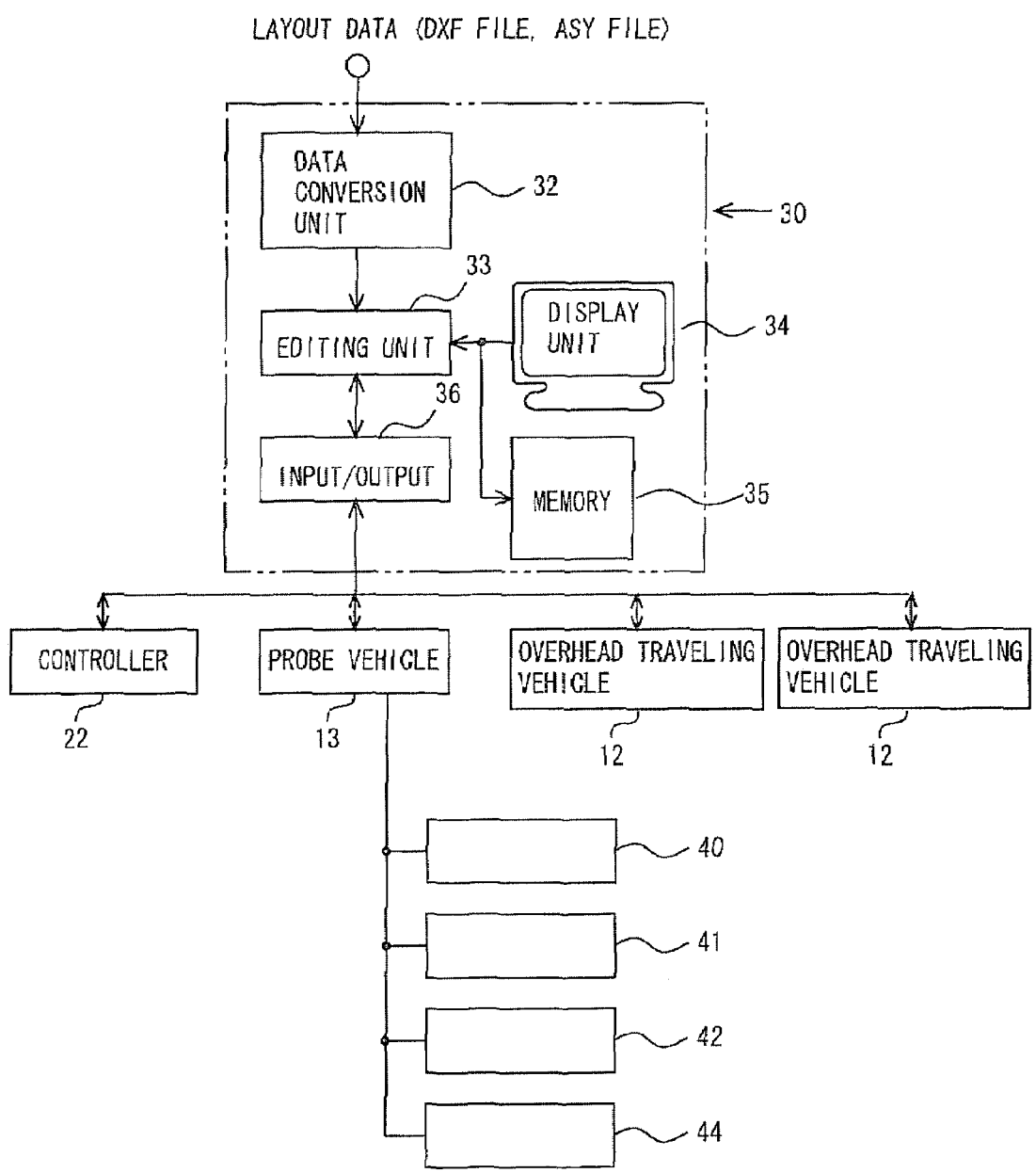
FIG. 3 is a block diagram showing an apparatus for editing map data used in the embodiment.
Figure 4:
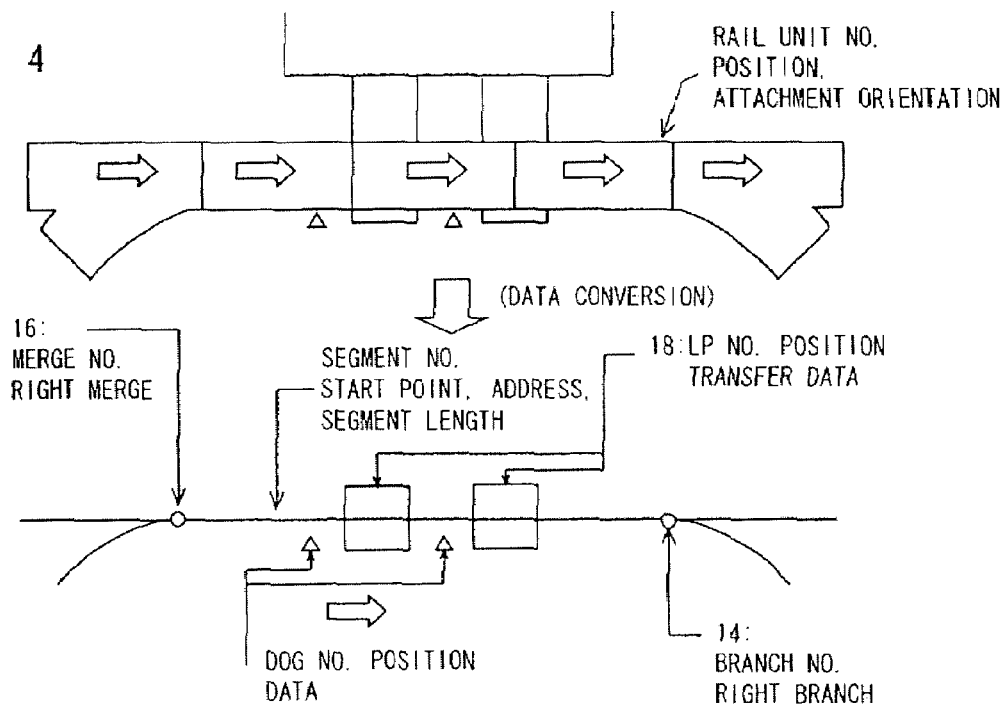
FIG. 4 is a view showing an example of converting CAD data into the map data.

FIGS. 2 to 4 show creation of a map of the travel routes, i.e., creation of map data, at the time of newly providing a guided vehicle system. CAD data is created for construction the guided vehicle system. Based on the drawings of the CAD data, the guided vehicle system is constructed. The CAD data includes the arrangement and connections of rail units such as straight rail units, branch rail units, merge rail units, and curve rail units, and positions of constructing load ports, buffers, dogs, and IDs. In general, the arrangement (layout) of the rail units is accurate. However, as for the positions of constructing the load ports, the buffers, the dogs, and the IDs, in most cases, the CAD data is different from the data of the actually constructed system.

The CAD data is inputted to a data conversion unit 32 of a map data editing apparatus 30 in a file format such as a DXF file or an ASY file. The map data editing apparatus 30 may be provided integrally with the controller 22, or may be provided separately from the controller 22. The DXF file is a general-purpose file format proposed by Autodesk, Inc., used for storing three-dimensional graphic data in a text format. The ASY file is a file format proposed by Brooks. The ASY file is one type of the CAD file. The data conversion unit 32 converts the CAD data into a file in a suitable format capable of handling vector data for expressing the layout and attribute data. The converted file is displayed on a screen of a display unit 34 through an editing unit 33, and the displayed file is edited by manual input means such as a mouse, a stylus, or a keyboard.

The layout on the CAD data may be edited by the editing unit 33. For example, in the case where the travel route is not separated into segments in the layout on the CAD data, the layout on the CAD data is edited to separate the travel route into segments, and assign numbers to the respective segments. Further, in the case where data such as the origin position, addresses of the respective segments based on the origin point (travel distance from the origin point) are not inputted in the CAD data, the editing unit 33 adds these items of data to the layout data.

In general, the CAD data is significantly different from the actual map data in the attribute data. The attribute data includes positions of load ports and buffers on the travel route, data about transfer to/from the load ports and the buffers, and positions of acceleration points, dogs, and IDs. These items of data are added as data of additional equipment or annotation to the layout data. In most cases, only the essential data has been inputted to the CAD data. Therefore, the attribute data is inputted by the manual input means (not shown) with reference to the screen 34, and the editing unit 33 edits the CAD data to create map data.

For example, on the upper side in FIG. 4, the CAD data is shown as a figure in which the arrangement and attachment orientations of travel rail units, and positions of load ports, or the like are shown. The arrangement of the travel rail units is converted into layout data in the map by the data conversion unit 32. The layout data does not directly show the arrangement of the travel rail units. The layout data is vector data showing the travel routes. Data such as a number assigned to each segment such as a segment from the merge section 16 to the branch section 14, and a travel distance (address) from the origin point to each segment, and the segment length are inputted as part of the layout data by the editing unit 33. Further, as data of the merge section 14 and the branch section 16, attribute data such as a serial number assigned to each of the merge section 14 and the branch section 16, the branch direction, and the merge direction are inputted. The branch direction and the merge direction are intermediate data between the data of the layout itself and its attribute data. Further, the positions of the load ports 18 and the buffers, the numbers assigned to the load ports 18 and the buffers, data about transfer to/from the load ports 18 and the buffers, the positions of the dogs, the IDs, and the acceleration points, the numbers assigned to the dogs, the IDs, and the acceleration points, and data related to these items of data are edited, i.e., added, modified, and deleted as attribute data by the editing unit 33. In this manner, the attribute data for the layout displayed on the display unit 34 is edited by the editing unit 33 to create the map data.

The created map data is stored in a memory unit 35, and distributed from an input/output 36 through a LAN (not shown) or the like to the controller 22, the respective overhead traveling vehicles 12, and the probe vehicle 13. At this stage, the created map data may not be distributed to normal overhead traveling vehicles 12, and only distributed to the probe vehicle 13 and the controller 22. The probe vehicle 13 travels along the travel route in FIG. 1, and verifies respective items of data on the map, in particular, attribute data. For example, the positions of the load ports, the buffers, or the like are verified by determining the revolution number of travel wheels or travel motor by an encoder. In the case of verifying the dogs and IDs, the dogs and IDs are detected by suitable sensors 42, and the states of the dogs and IDs are also inspected. In the same manner, transfer means 44 mounted in the probe vehicle is operated to verify, or newly obtain data about transfer of an article between the load port and the buffer. Further, the probe vehicle inspects the states of the travel routes, e.g., whether there are any positions with significant vibration during traveling, and whether there are any steps, and writes the results in the map. If necessary, maintenance and repair of the travel routes are provided.

The most part of data verified in this manner is attribute data. The probe vehicle updates the map stored in the probe vehicle using the verified data, and the updated map is distributed to the other overhead traveling vehicles 12 and the map data editing apparatus 30 through the controller 22. In this manner, using the map with verified attribute data, operation of the guided vehicle system is started.

Figure 5:
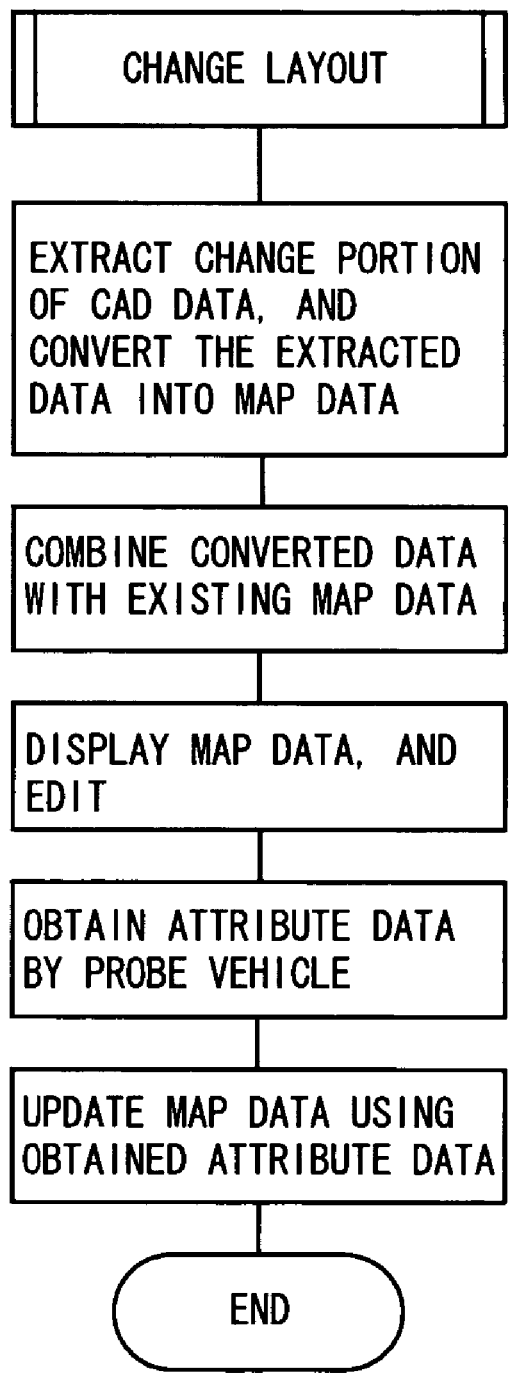
FIG. 5 is a flowchart showing an algorithm of updating the map data at the time of changing the layout.

In the case of changing the layout of the guided vehicle system, e.g., in the case of adding a bay route, as shown in FIG. 5, change portion of the CAD data is extracted, and converted into layout data. The converted data is combined with map data that does not include the change portion. In the same manner as in the case of FIGS. 2 to 4, for example, the attribute data is edited, and verification by the probe vehicle is performed. The verified data is distributed to the respective overhead traveling vehicles and the controller. Then, operation of the guided vehicle system is started. In particular, for the portion of the CAD data which has been converted into the layout data, the attribute data is obtained by the probe vehicle, and the obtained attribute data is added to the map.

The embodiment has been described in connection with the case in which a certain overhead traveling vehicle is used as the probe vehicle. Alternatively, all of the overhead traveling vehicles may have the functions of the probe vehicle.

The invention claimed is:

1. A guided vehicle system, wherein a guided vehicle stores a map of a travel route and travels along the travel route, the guided vehicle system comprising:
   display means for displaying a layout of the travel route on a screen;
   editing means for inputting attribute data on the travel route to the displayed layout for creating the map;
   a plurality of load ports and a plurality of buffers for temporally storing articles along the travel route; and
   a plurality of dogs and IDs for reading data provided on the travel route; said guided vehicle includes:
      transfer means;
      a first sensor means for verifying the positions of the load ports and the buffers;
      a second sensor means for verifying the positions and states of the dogs and IDs,
      wherein the transfer means is operated to verify data about transfer of articles between the load ports and said guided vehicle and between the buffers and said guided vehicle.

2. The guided vehicle system of claim 1, further comprising conversion means for converting CAD data used for constructing the guided vehicle system into the layout of the travel route.

3. The guided vehicle system of claim 2, wherein at the time of changing the layout, the conversion means extracts change portion of the CAD data, converts the extracted change portion into the layout, and combines the layout with the map before the change.

* * * * *